W. I. Blackman,
Cotton Press.
No. 104,103. Patented June 14, 1870.
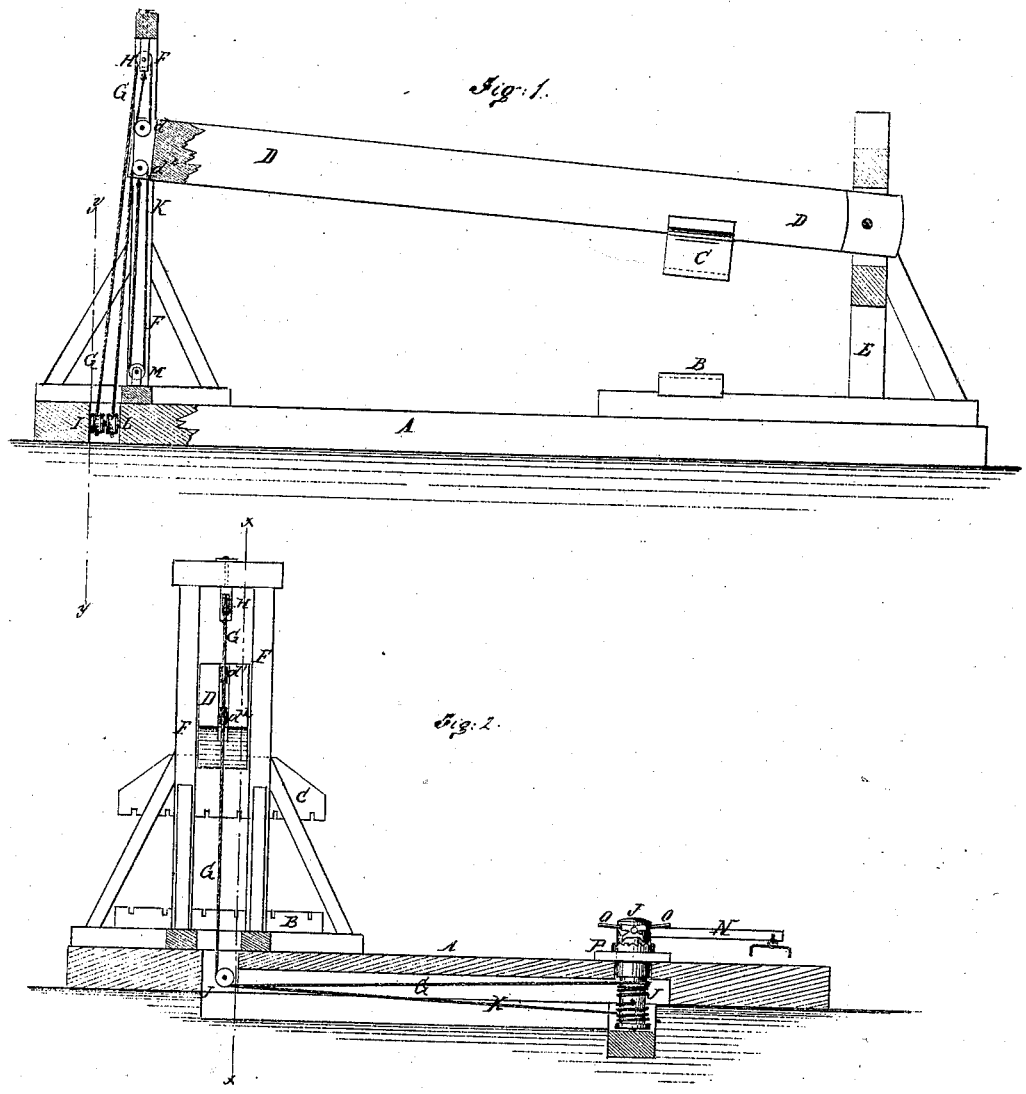
Witnesses:
Chas. Nida
Edgar Tate
Inventor:
W. I. Blackman
per [Attorneys signature]
Attorneys.

United States Patent Office.

WILLIAM I. BLACKMAN, OF COLUMBUS, MISSISSIPPI.

Letters Patent No. 104,103, dated June 14, 1870.

IMPROVEMENT IN PRESSES FOR COTTON, &c.

The Schedule referred to in these Letters Patent and making part of the same.

*To all whom it may concern:*

Be it known that I, WILLIAM I. BLACKMAN, of Columbus, in the county of Lowndes and State of Mississippi, have invented a new and Improved Press for Cotton and other substances; and I do hereby declare that the following is a full, clear, and exact description thereof, which will enable others skilled in the art to make and use the same, reference being had to the accompanying drawing forming part of this specification, in which—

Figure 1 is a vertical longitudinal section of my improved press, taken through the line x x, fig. 2.

Figure 2 is an end view of the same, partly in section, through the line y y, fig. 1.

Similar letters of reference indicate corresponding parts.

My invention relates to cotton-presses of that class in which the lever or follower is pivoted at one end and raised and lowered by ropes, and My improvement consists in providing a press in which the lever is raised by the rotation of the winding-drum, and is lowered, or forced downward to compress the bale, by rotating the same drum in the opposite direction.

The construction and arrangement of parts whereby this is affected, is hereinafter fully described.

A represents the floor, platform, or ground upon which the press stands.

B is the block upon which the bale rests while being pressed, and which should be surrounded with a box, to give the desired shape to the pressed bale.

C is the block, which is pressed down upon the upper side of the bale to compress it.

The blocks B and C are grooved in the ordinary manner, to receive the bands or hoops of the bale.

The block C is attached to or connected with the lever D, so as to be forced downward to compress the bale by the downward movement of said lever.

The rear end of the lever D is pivoted to and between the standards E, which are strongly framed together, and securely supported and braced in a vertical position.

The forward end of the lever D passes and moves up and down between the standards F, the upper ends of which are connected and held in their proper relative positions by a cross-bar, and which are securely braced in an upright position.

G is a rope or chain, the end of which is attached to the block of a single fixed pulley, H, suspended from the cross-bar of the standards F.

The rope G passes down and around a pulley, $d'$, pivoted in a slot formed in the forward end of the lever D, up and around the pulley H, down and around a pulley, I, pivoted beneath the surface of the floor platform or ground A to some suitable support, and thence along a channel beneath said surface to the drum or vertical shaft J, around which it is wound, and to which its end is attached.

K is another rope or chain, the end of which is attached to, and which is wound around the drum or shaft J in an opposite direction from the rope G, so that one of the ropes G K may be wound upon said drum or shaft J as the other is unwound from it.

The rope K passes from the drum or shaft J to and around the pulley L, up and around the pulley $d^2$, pivoted in a slot in the forward end of the lever D, down and around the single fixed pulley M attached to the foundation-frame of the standards F, and up, and is attached to the end of the lever D, so that, by turning the shaft or drum J in one direction the lever D will be drawn downward to compress the bale, and, by turning said drum or shaft in the other direction, the said lever will be drawn upward to release the compressed bale and allow another one to be placed in the press.

The upper end of the drum or shaft J projects above the surface of the floor or ground A, and to it is securely attached a lever or sweep, N, to the opposite sides of the outer end of which are attached hooks for the attachment of the whiffletree with which the horse is to be connected, so that, by shifting the whiffletree from one side to the other of the sweep or lever N, the lever D may be both raised and lowered by the direct draft of the horse, thus enabling the press to be worked much faster than presses otherwise constructed.

The upper part of the drum or shaft J is provided with a double-lever pawl, O, which takes hold of the ratchet-wheel P attached to the upper bearings for said shaft or drum J, so as to hold it securely in any position into which it may be revolved, in whatever direction it may be moving.

Having thus described my invention,

I claim as new and desire to secure by Letters Patent—

An improved press, formed by the combination of the blocks B and C, lever D, uprights E, standards F, ropes or chains G and K, pulleys H $d^1$ I and L $d^2$ M, drum or shaft J, and sweep or lever N, the double-lever pawl O, and ratchet-wheel P, with the platform A, each of said parts being constructed, arranged, and operating as shown and described, whereby the lever is raised or lowered according to the direction of the rotation of the drum.

The above specification of my invention signed by me this 25th day of November, 1869.

W. I. BLACKMAN.

Witnesses:
P. GALVIN,
J. C. EWBANKS.